No. 12,810. REISSUED JUNE 9, 1908.

E. A. McKOY.

SAP RECEIVING RECEPTACLE.

APPLICATION FILED JULY 2, 1907.

2 SHEETS—SHEET 1.

Inventor,

Edwin A. McKoy,

By Mason Fenwick & Lawrence,

Attorneys

Witnesses

J. M. Fowler Jr.

L. L. Merrill.

THE NORRIS PETERS CO., WASHINGTON, D. C.

No. 12,810. REISSUED JUNE 9, 1908.

E. A. McKOY.

SAP RECEIVING RECEPTACLE.

APPLICATION FILED JULY 2, 1907.

2 SHEETS—SHEET 2.

Inventor,

Edwin A. McKoy,

By Mason Fenwick & Lawrence,

Attorneys

Witnesses

J. M. Fowler Jr.

L. D. Morrill

THE NORRIS PETERS CO., WASHINGTON, D. C.

UNITED STATES PATENT OFFICE.

EDWIN ANDERSON McKOY, OF NEW ORLEANS, LOUISIANA.

SAP-RECEIVING RECEPTACLE.

No. 12,810. Specification of Reissued Letters Patent. Reissued June 9, 1908.

Original No. 818,278, dated April 17, 1906, Serial No. 281,063. Application for reissue filed July 2, 1907. Serial No. 381,932.

*To all whom it may concern:*

Be it known that I, EDWIN ANDERSON McKOY, a citizen of the United States, residing at New Orleans, in the parish of Orleans and State of Louisiana, have invented certain new and useful Improvements in Sap-Receiving Receptacles; and I do hereby declare the following to be a full, clear, and exact description of the invention, such as will enable others skilled in the art to which it appertains to make and use the same.

This invention relates to improvements in receptacles for receiving sap from trees, and particularly to "turpentine-cups".

One of the objects of the invention is the provision of a peculiarly-constructed support constituting an apron which is capable of supporting a removable receptacle.

Another object of the invention is the provision of means for facilitating the collecting of sap from timber.

With these and other objects in view the invention comprises certain novel constructions, combinations, and arrangements of parts, as will hereinafter be fully described and claimed.

Figure 1:
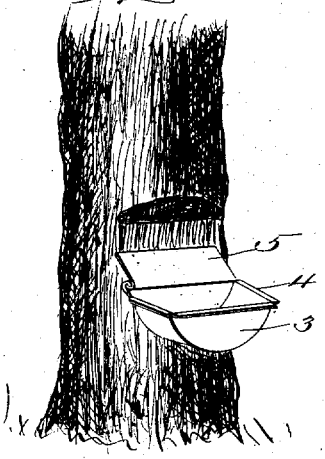
Figure 2:
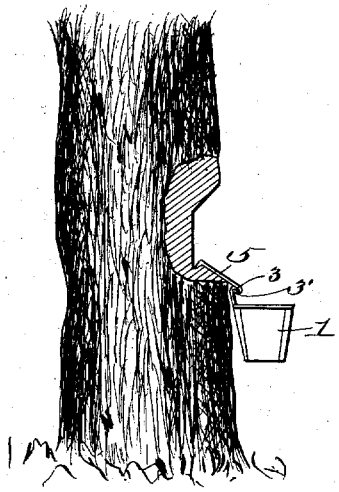
Figure 3:
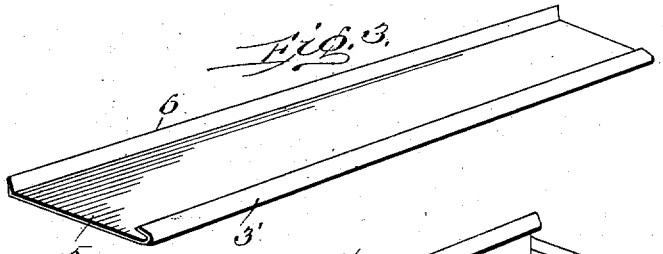
Figure 4:
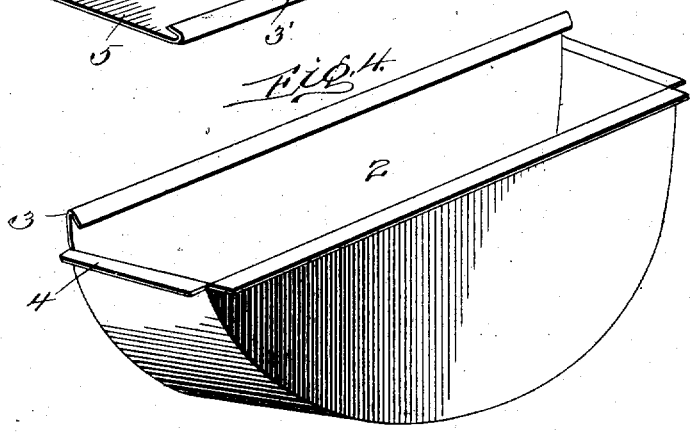
Figure 5:
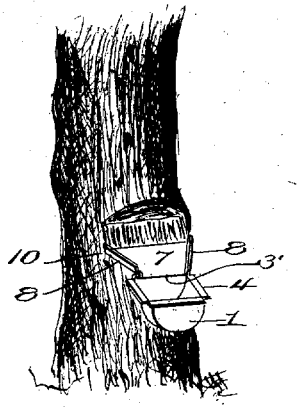
Figure 6:
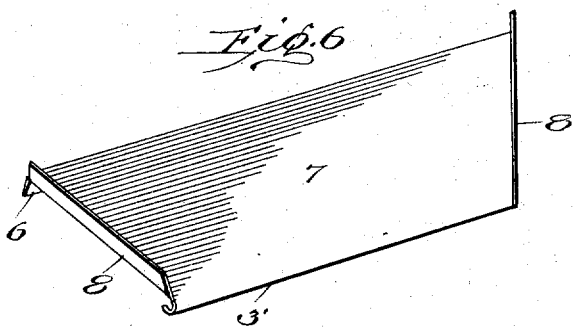

In the accompanying drawings:—Figure 1 is a perspective view of my invention supported upon a tree. Fig. 2 is a view in side elevation of the structure depicted in Fig. 1. Fig. 3 is an inverted perspective view of the apron. Fig. 4 is a perspective view of the receptacle or "cup". Fig. 5 is a view similar to Fig. 1, showing another embodiment of the apron. Fig. 6 is a perspective view of the embodiment of the apron depicted in Fig. 5.

Referring to the drawings, 1 designates the body of the receptacle, the rear wall 2 of which is extended beyond the upper edge of the front and end walls and terminates in an engaging means as the angular or curved flange 3, constituting a hook. The flange 3 is preferably substantially the same length as the receptacle. The single flange here shown is formed by bending a portion of the rear or back wall over and into a substantially parallel position with the rear wall. It is to be noted that the bent-over portion of the back preferably projects downwardly toward the inside of the receptacle. The receptacle 1 is preferably provided with horizontal flanged edges 4—4, formed upon its front wall or side, and its ends.

The apron 5, constituting a bracket, is preferably formed from a single sheet, and upon its front edge there is an integral, annular, or curved flange 3′, constituting a hook. The flange 3′ preferably extends substantially the entire length of the apron. The body of the apron is flat, so as to facilitate the discharge of the sap into the receptacle when said receptacle is supported upon the apron, Figs. 1, 2 and 5. The rear edge of the apron 5 is provided with an extension or flange 6, which projects downwardly from said apron at substantially right angles. The extension 6 is preferably beveled or sharpened at its edge. The apron 5 constitutes a bracket which removably supports the receptacle 1.

A niche is formed in a tree and an incision is made by any suitable implement, within which is positioned the longitudinally-extending flange 6 of the apron, and if the receptacle has not been positioned upon said apron the flange or hook 3 may be positioned upon the flange or hook 3′ and the receptacle 1 moved longitudinally of the apron or bracket until the entire hook 3 is in engagement with the hook 3′, Fig. 1. It will also be understood that the receptacle may be engaged upon the hook 3 by tilting the receptacle upwardly in front and inserting the edges of the hook 3 within the flange 3′ and then allowing the receptacle to fall. It is not necessary to remove the apron from the tree when it is desired to remove the receptacle, for by moving the receptacle longitudinally of its supporting member the same can be detached therefrom. The receptacle may also be removed by tilting the front, thus disengaging the hooks. The apron or bracket 5 lies flat against the lower portion of the niche cut in the tree, Fig. 2, and thereby prevents any sap or gum from flowing beneath the same. The dripping or running sap must pass onto the apron and flow into the receptacle carried thereby. The lower flanged or hooked edge of the apron extends beyond the rear wall of the receptacle when said receptacle is suspended from said apron, thereby depositing the sap or gum into the receptacle without permitting it to run down the inside of the rear wall. The close proximity of the rear wall of the receptacle to the support, preferably a tree, upon which the apron is positioned, prevents the receptacle from becoming displaced, as the distance between the tree and the receptacle is less than the width of the bent-over portion of the receptacle which constitutes the flange or hook 3, and the weight of material within the receptacle also preventing the disengaging of the connections.

In Figs. 5 and 6 I have shown the apron 7 provided with vertically extending flanges 8—8. These flanges converge toward the flanged or hooked end 3′ for directing sap into a smaller receptacle than that usually employed with apron 5. The flanged end 3′ and the sharpened flange 6 are similarly constructed to the like parts in the other embodiment of the invention depicted in Figs. 1 to 4. The converging flanged portions of the apron 7 are formed by turning up the ends of a blank, which has been cut diagonally at each end. It will be obvious that by using the apron 7 the device can be positioned upon a tree having a notch or niche cut therein the same size as if it were formed for receiving apron 5. A smaller receptacle than that used with apron 5 may also be positioned upon apron 7.

What I claim is:—

1. In a device of the character described, the combination of an apron provided with a rearwardly-extending flange, a receptacle provided with an inwardly extending flange, the flange of said receptacle engaging the flange of said apron, whereby said receptacle is supported upon the apron.

2. A device of the character described, comprising a substantially flat apron, a sharpened flange formed upon the upper edge of said apron, and a curved flange formed upon the lower edge of said apron, and a receptacle engaging and supported upon the curved flange of said apron.

3. A device of the character described, comprising an apron provided with supporting means formed upon its lower portion, and a slidable receptacle engaging and suspended upon said supporting means, said receptacle movable longitudinally thereof and capable of being entirely removed from said supporting means by sliding it off of the same at one end of said apron.

4. A device of the character described, comprising an apron provided with flanged ends, penetrating means formed upon one of the longitudinal edges of said apron and supporting means formed upon the opposite longitudinal edge, and a longitudinally movable receptacle carried by said supporting means and capable of being removed entirely from said apron at one of its ends.

5. In a device of the class described, the combination of an apron provided with a hooked flange at its lower edge, of a receptacle having upstanding hooked means adapted and proportioned for engagement with the flange at spaced points.

In testimony whereof I affix my signature in presence of two witnesses.

EDWIN ANDERSON McKOY.

Witnesses:
A. VIZOT, Jr.,
JAMES J. McLOUGHLIN.